(12) United States Patent  
Moosberg

(10) Patent No.: US 6,860,443 B2
(45) Date of Patent: Mar. 1, 2005

(54) MULTIPLIER TYPE FISHING REEL

(75) Inventor: Börje Moosberg, Mörrum (SE)

(73) Assignee: Pure Fishing Inc., Spirit Lake, IA (US)

( * ) Notice: Subject to any disclaimer, the term of this patent is extended or adjusted under 35 U.S.C. 154(b) by 0 days.

(21) Appl. No.: 10/776,161

(22) Filed: Feb. 12, 2004

(65) Prior Publication Data

US 2004/0159731 A1 Aug. 19, 2004

(30) Foreign Application Priority Data

Feb. 12, 2003 (SE) .............................................. 0300372

(51) Int. Cl.$^7$ .............................................. A01K 89/01
(52) U.S. Cl. ...................................... 242/286; 242/288
(58) Field of Search ................................ 242/285, 286, 242/288, 289, 303, 304

(56) References Cited

U.S. PATENT DOCUMENTS

| | | | | |
|---|---|---|---|---|
| 4,390,140 A | * | 6/1983 | Karlsson et al. | 242/289 |
| 5,556,048 A | * | 9/1996 | Hashimoto | 242/288 |
| 6,086,005 A | * | 7/2000 | Kobayashi et al. | 242/288 |
| 6,126,105 A | * | 10/2000 | Yamaguchi | 242/288 |
| 6,254,021 B1 | * | 7/2001 | Morimoto et al. | 242/289 |
| 6,481,657 B1 | * | 11/2002 | Oishi et al. | 242/289 |

* cited by examiner

Primary Examiner—Emmanuel Marcelo
(74) Attorney, Agent, or Firm—Harness, Dickey & Pierce, P.L.C.

(57) ABSTRACT

A multiplier type fishing reel has a frame, two side plates which are mounted on the frame, a line spool which is mounted in the frame and rotatable about an axis of rotation, and a first and a second brake for braking the line spool. The braking effect of the first brake is adjustable with the aid of a first adjusting device which is turnable about an axis parallel to the axis of rotation and the braking effect of the second brake is adjustable with the aid of a second adjusting device which is turnable about an axis parallel to the axis of rotation. The first and the second adjusting devices are arranged in one of the side plates and have respectively a first and a second tooth portion. An operating device, which is turnable about an axis parallel to the axis of rotation, is mounted on said one side plate and has at least one tooth element meshing with both tooth portions to make, in turning of the operating device, respectively the first and the second adjusting device turn for adjusting the braking effect of the respective brakes on the line spool.

19 Claims, 6 Drawing Sheets

MULTIPLIER TYPE FISHING REEL

The present application hereby claims priority under 35 U.S.C. §119 on Swedish patent application number SE 0300372-0 filed Feb. 12, 2003, the entire contents of which are hereby incorporated herein by reference.

FIELD OF THE INVENTION

The present invention generally relates to a multiplier type fishing reel having a frame, two side plates which are mounted on the frame, a line spool which is mounted in the frame and rotatable about an axis of rotation, a first and a second brake for braking the line spool, the braking effect of the first brake on the line spool being dependent on the speed of rotation thereof and adjustable with the aid of a first adjusting device which is turnable about an axis parallel to the axis of rotation and the braking effect of the second brake on the line spool being independent of the speed of rotation thereof and adjustable with the aid of a second adjusting device which is turnable about an axis parallel to the axis of rotation.

The two brakes are used to brake the line spool during casting, thereby to prevent rotation of the line spool at a speed which is higher than the pay-out speed of the line, which usually results in backlash with consequent tangling of the line.

BACKGROUND ART

In most prior-art fishing reels of this kind, the first brake is arranged at one side of the fishing reel, its adjusting device being operable by way of a first operating knob arranged in one side plate, and the second brake being arranged at the other side of the fishing reel, its adjusting device being operable by way of a second operating knob arranged in the other side plate. In some prior-art fishing reels of this kind, the two brakes are arranged at one side of the fishing reel and each operable by way of an operating knob arranged in one side plate. When adjusting the braking effect which is to be exerted by the two brakes on the line spool during casting, the fisherman must first adjust the braking effect of one brake by turning one operating knob and then adjust the braking effect of the other brake by turning the other operating knob. It is very difficult for the fisherman to set a suitable total braking effect and still more difficult to adapt the braking effect of the two brakes to each other.

SUMMARY OF THE INVENTION

An object of an embodiment of the present invention is to provide a multiplier type fishing reel which has a first and a second brake, and in which the total braking effect of the brakes on the line spool can be set in a simple manner while at the same time the relative braking condition of the two brakes can be automatically adapted to each other.

According to an embodiment of the invention, this object may be achieved by a fishing reel including:

- a first and the second adjusting device arranged in one side plate and have respectively a first and a second tooth portion provided with toothing, and an operating device, which is turnable about an axis parallel to the axis of rotation, is mounted on said one side plate and operable from the outside thereof and has at least one tooth element meshing with the first and the second tooth portion to make, in turning of the operating device, respectively the first and the second adjusting device turn for adjusting the braking effect of the respective brakes on the line spool.

This solution makes it possible to set the total braking effect of the two brakes in a simple manner by turning the common operating device. By this turning, the adjusting device of the two brakes are made to turn for adjusting the braking effect of the respective brakes on the line spool. The adjusting of the braking effect of one brake is dependent on the adjusting of the braking effect of the other brake, and this dependence is set in advance at the factory by selecting suitable components and dimensions of the components, so that the fisherman does not have to worry about adapting the braking effect of the brakes to each other.

In a preferred embodiment, the operating device has a first tooth element meshing with the first tooth portion, and a second tooth element meshing with the second tooth portion.

The axes of the first and the second adjusting device preferably coincide with the axis of rotation, the first and the second adjusting device being axially spaced from each other.

In a preferred embodiment, the operating device and the adjusting device are arranged so that turning of the operating device in one direction makes both the first and the second adjusting device turn for increasing the braking effect of the respective brakes on the line spool, and turning of the operating device in the other direction makes both the first and the second adjusting device turn for reducing the braking effect of the respective brakes on the line spool.

The first brake can be, for example, a magnetic brake, and the second brake can be, for example, a mechanical friction brake.

BRIEF DESCRIPTION OF THE DRAWINGS

The invention will now be described in more detail by way of a preferred embodiment and with reference to the accompanying drawings, in which.

DESCRIPTION OF A PREFERRED EMBODIMENT

Figure 1:
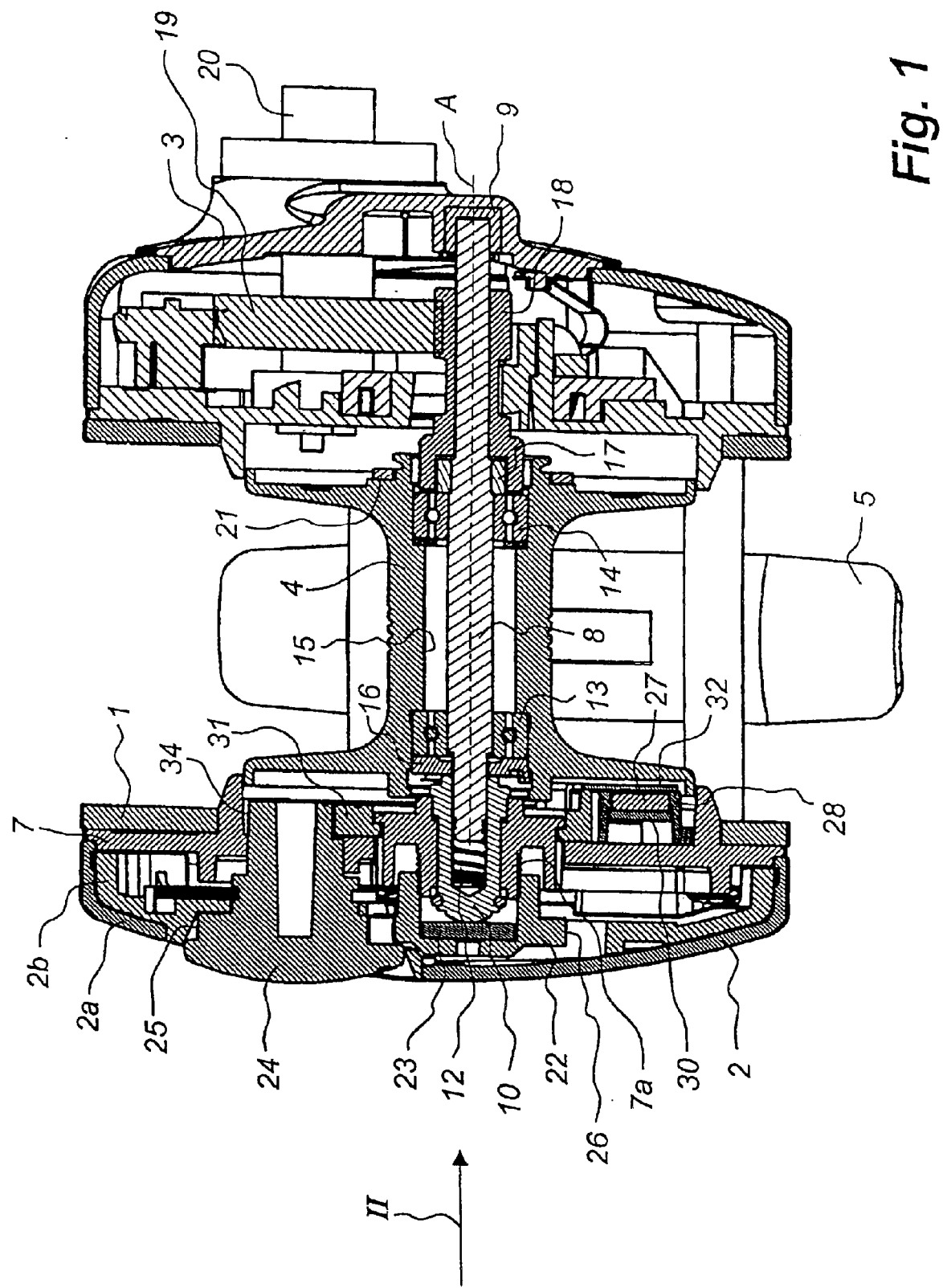
FIG. 1 is a longitudinal section along line I—I in FIG. 2 and shows a fishing reel according to an embodiment of the present invention.

The multiplier type fishing reel shown in FIG. 1 has a frame 1, two side plates 2 and 3, a line spool 4 mounted in the frame 1 for receiving a line (not shown) and a foot 5 for mounting the fishing reel on a fishing rod (not shown).

Figure 3:
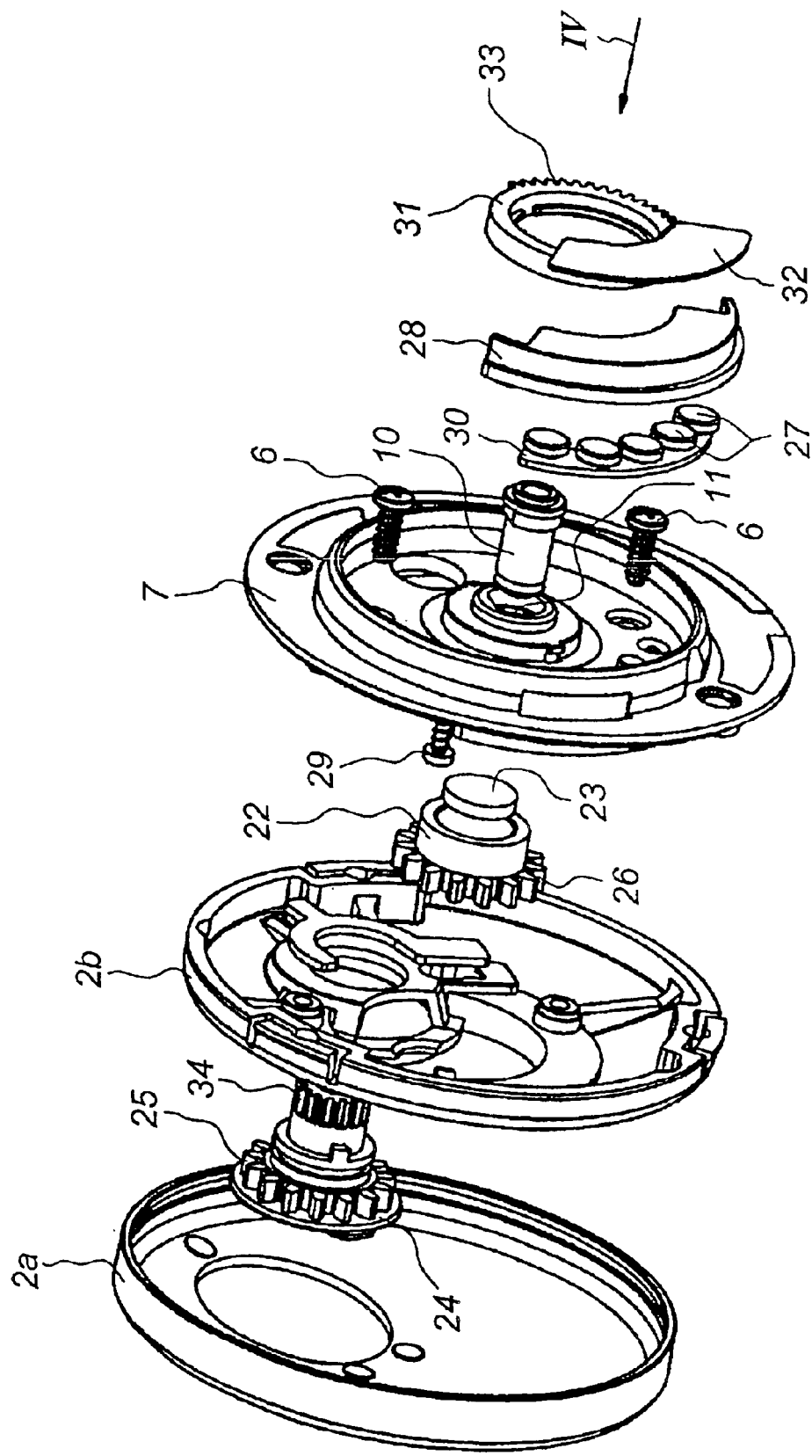
FIG. 3 is an exploded view and shows some of the components of the fishing reel shown in FIG. 1.

The right side plate 3, which will not be described in detail here, is screwed to the frame 1. The left side plate 2 consists of a cap-shaped outer part 2a and a cap-shaped inner part 2b, to which the outer part 2a is snapped on. The inner part 2b is attached by way of screws 6 (FIG. 3) to a mounting plate 7 which in turn is screwed to the frame 1.

A line spool shaft 8 is at its one end inserted into a cup-shaped sleeve 9 which is fixed in the right side plate 3, and at its other end inserted into a cup-shaped sleeve 10 extending through the mounting plate 7. The sleeve 10 is non-rotatably but axially displaceably mounted in a through hole 11 (FIG. 3) in an externally threaded hub portion 7a projecting to the left and positioned on the mounting plate 7, the bottom end of the sleeve 10 extending beyond the mounting plate. A compression spring 12 is arranged in the sleeve 10 between the bottom thereof and the end of the line spool shaft 8.

The line spool 4 is rotatably supported on the shaft 8 by way of two ball bearings 13 and 14 which are mounted a distance into the line spool 4 in a central through opening 15 in the same. The line spool 4 is rotatable about the axis of rotation A defined by the line spool shaft 8. A friction washer 16, which is non-rotatably connected to the line spool 4, is arranged in the central opening 15 axially outside the left ball bearing 13. A sleeve 17 is fixed to the shaft 8 axially outside the ball bearing 14.

A coupling device in the form of a toothed coupling sleeve 18 is rotatably and axially displaceably mounted on the shaft 8. The coupling sleeve 18 meshes at its right end with a drive gear 19 which is non-rotatably mounted on a drive shaft 20 which is rotatable by way of a handle (not shown). The coupling sleeve 18 is shown in FIG. 1 in a coupling position, in which the left end thereof is in prior-art manner drivingly engaged with a coupling ring 21 non-rotatably connected to the line spool 4. When a cast is to be made, the coupling sleeve 18 is displaced in prior-art manner by way of an operating key (not shown) to the right to a disengaged position, in which it is drivingly disengaged from the coupling ring 21. When the coupling sleeve 18 is in its disengaged position, the line spool 4 can rotate freely on the shaft 8. When starting to rotate the handle in the direction of retrieval, i.e. the direction in which that part of a line fixed to the line spool 4 which has been reeled out during casting, is again wound onto the spool, the coupling sleeve 18 is in prior-art manner automatically returned to its coupling position for rotating the line spool 4.

The fishing reel has a mechanical brake for braking the line spool 4 during casting. This mechanical brake, whose braking effect on the line spool 4 is independent of the speed of rotation thereof and which comprises the friction washer 16 and the cup-shaped sleeve 10, is adjustable with the aid of an adjusting device in the form of a cup-shaped sleeve 22 which is internally threaded and screwed to the hub portion 7a of the mounting plate 7. A disk 23 made of an elastic material, such as rubber, is placed in the sleeve 22 and abuts against the bottom thereof. The sleeve 22 is arranged to press, by way of the disk 23, the sleeve 10 into frictional engagement with the friction washer 16. The power by which the sleeve 10 is pressed against the friction washer 16 and, thus, the braking effect of the mechanical brake on the line spool 4 are adjusted by rotation of the sleeve 22. The sleeve 22 is rotated with the aid of an operating device in the form of an adjusting knob 24, which is mounted in the left side plate 2 and turnable about an axis parallel to the axis of rotation A. The adjusting knob 24 has an outer first toothing 25 which meshes with an outer toothing 26 of the sleeve 22, thereby, in turning of the adjusting knob 24, making the sleeve 22 rotate for adjusting the braking effect of the mechanical brake on the line spool 4.

Figure 2:
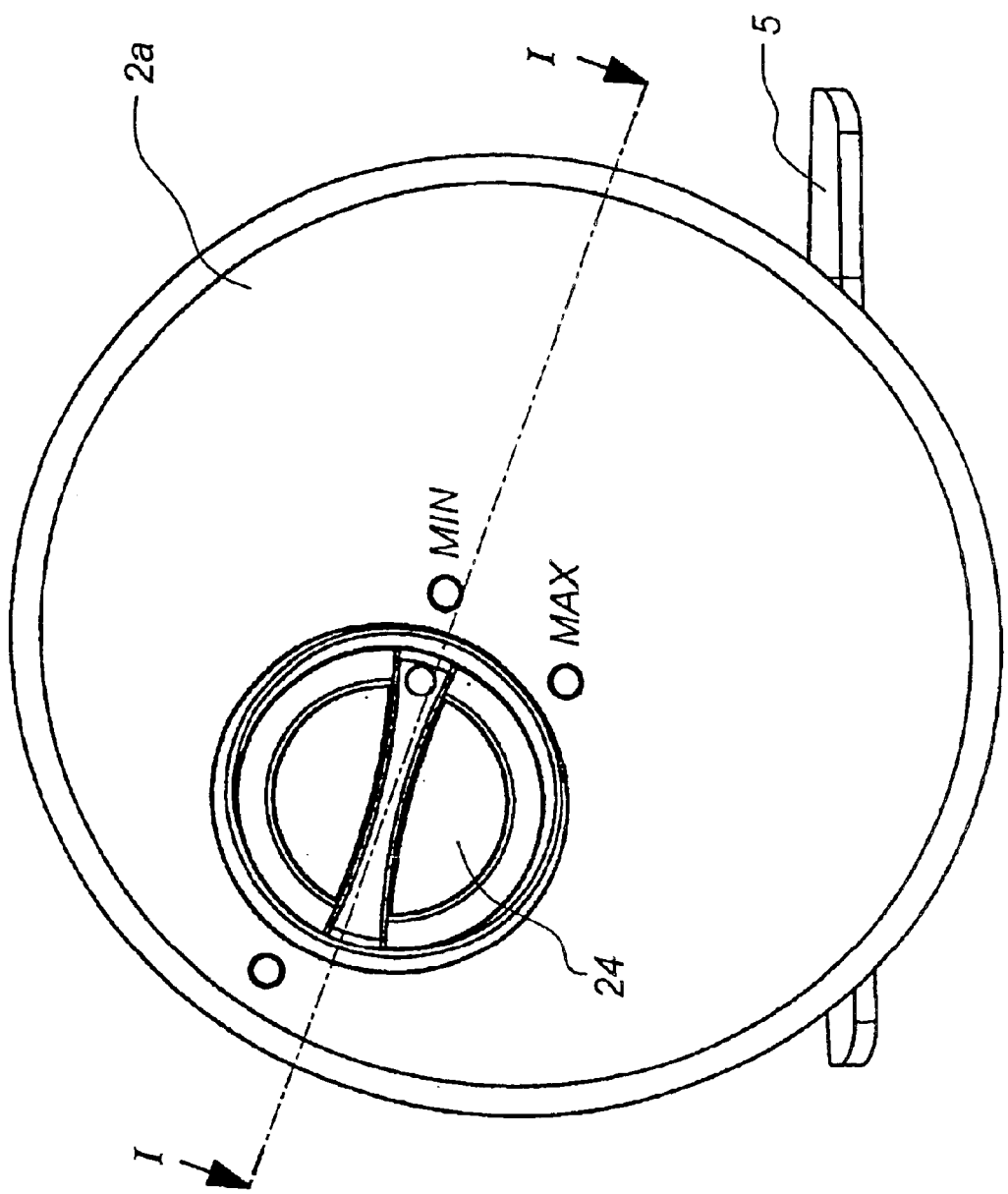
FIG. 2 is an end view and shows the fishing reel in the direction of arrow II in FIG. 1.

The adjusting knob 24 is turnable between a first position (MIN), in which it is shown in FIG. 2 and in which the braking effect of the mechanical brake on the line spool 4 is canceled, and a second position (MAX), which differs from the first position in a counterclockwise direction (with respect to FIG. 2) by about $_{320}$°, and in which the braking effect of the mechanical brake on the line spool 4 is at its maximum.

The fishing reel also has an induction type magnetic brake for braking the line spool 4 during casting. The line spool 4, which in this example is made of aluminum, has at each end an end wall 4a, 4b perpendicular to the shaft 8. The magnetic brake, whose braking effect on the line spool 4 is dependent on the speed of rotation thereof, has a plurality of permanent magnets 27 for inductive cooperation with the left end wall 4a of the line spool 4. The magnets 27 are carried by an arcuate magnet support 28, which by way of screws 29 is fixed to the mounting plate 7 close to the end wall 4a. The magnet support 28 is in this example made of a plastic material and has an arcuate recess, whose opening faces the mounting plate 7. The magnets 27 are flat and circular-cylindrical and are arranged in this recess, in which they are kept in place in a first plane perpendicular to the axis of rotation A by an arcuate cover plate 30 made of iron. The magnets 27 are distributed along a circular arc and are thus located at the same radial distance from the axis of rotation A. The magnetic brake has an adjusting device, which consists of a wheel 31 which is turnably mounted on the mounting plate 7 and coaxial with the line spool shaft 8, and, attached to the wheel, an arcuate shielding plate 32 made of iron, which is arranged in a second plane, perpendicular to the axis of rotation A, between the magnets 27 and the end wall 4a of the line spool 4. The wheel 31 has, along part of its circumference, an external toothing 33, which meshes with an external second toothing 34 of the adjusting knob 24. The arcuate recess of the magnet support 28, the arcuate cover plate 30, the arcuate shielding plate 32 and the toothing 33 of the wheel 31 have an extent of about 110°.

Figure 4:
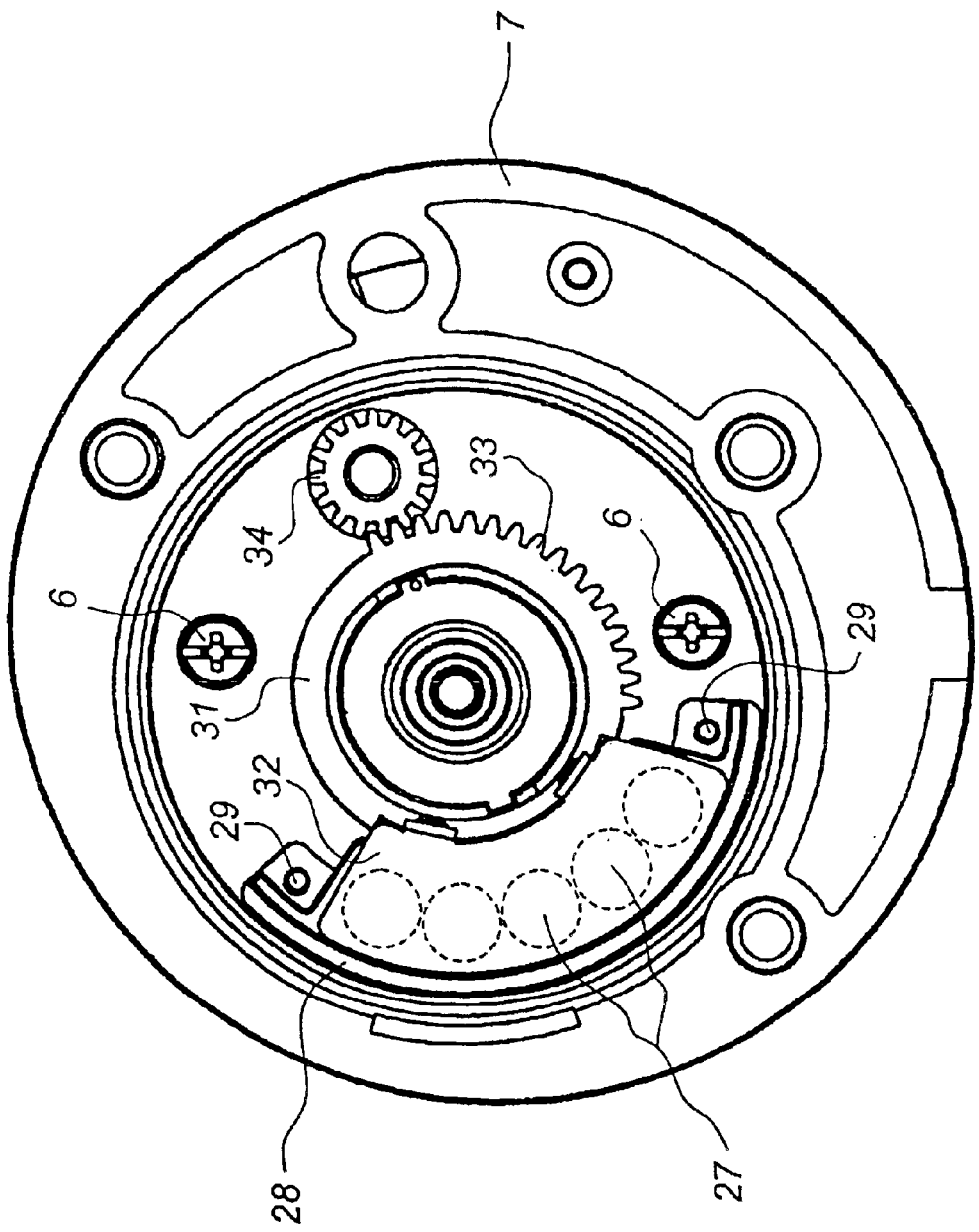
FIG. 4 is an end view and shows the components shown in FIG. 3 in an assembled position in the direction of arrow IV in FIG. 3, a magnetic brake being shown in a first position according to FIG. 1.
Figure 5:
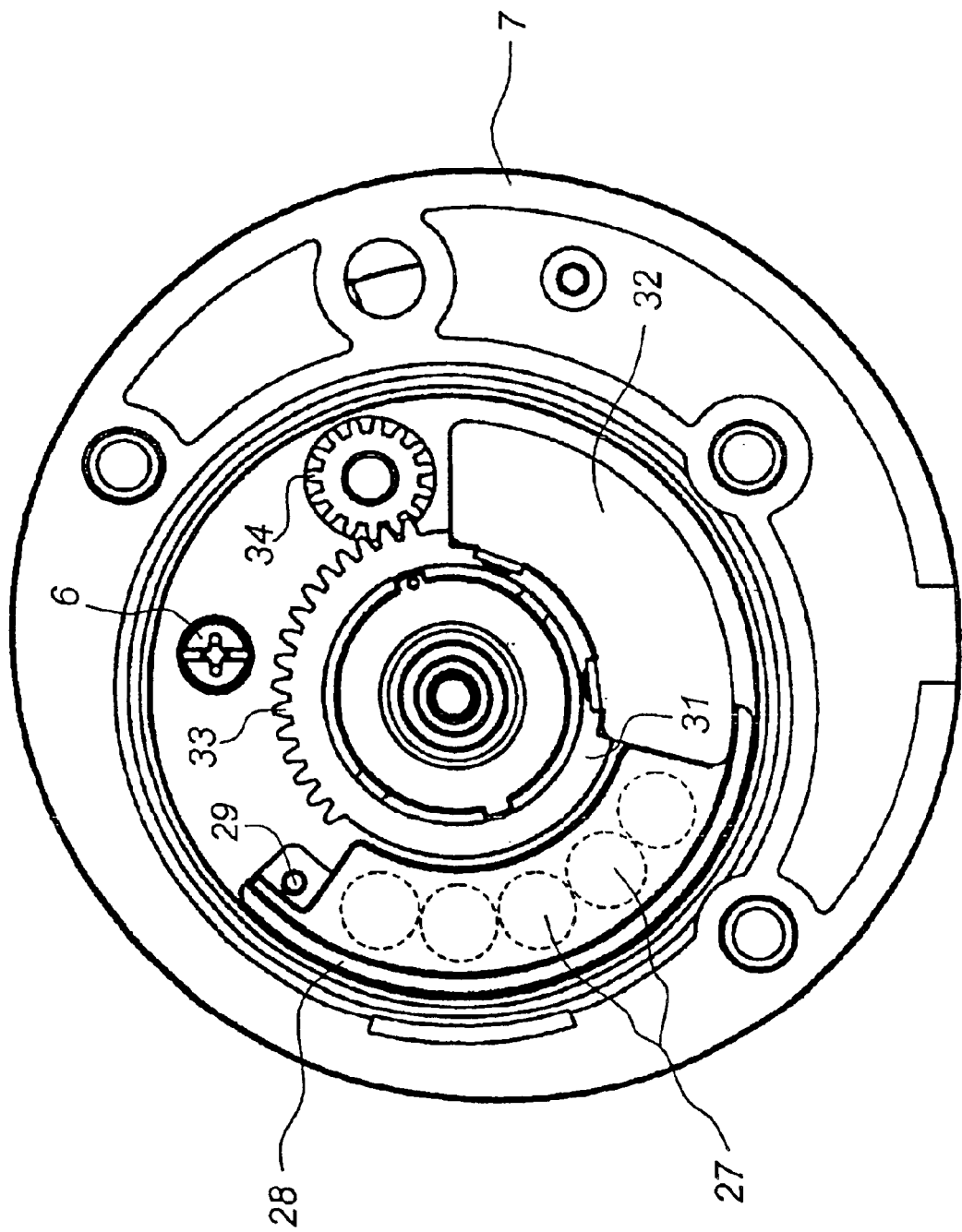
FIG. 5 corresponds to the FIG. 4 but shows the magnetic brake in a second position.
Figure 6:
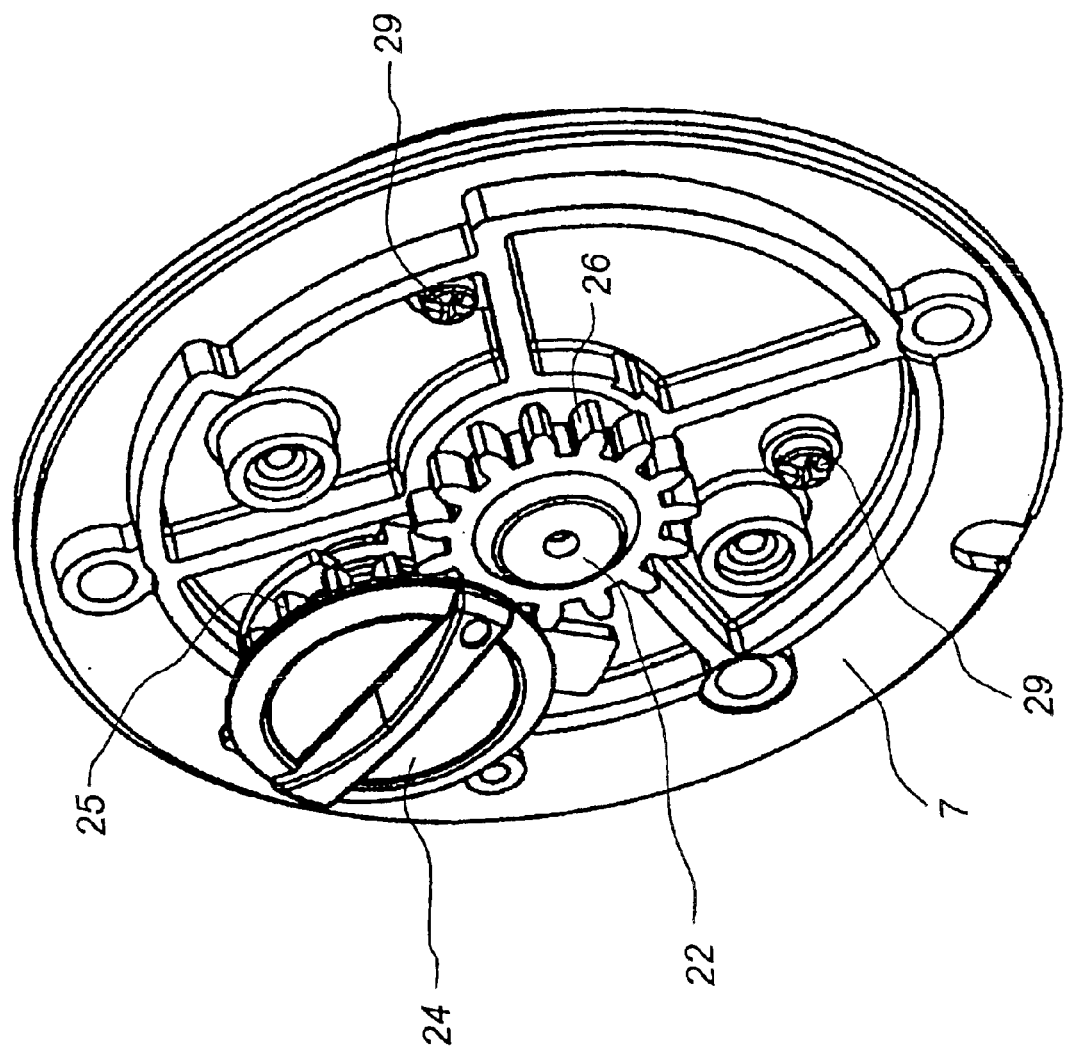
FIG. 6 is a perspective view and shows the components shown in FIGS. 4 and 5 from the opposite side, the side plate, the left one in FIG. 1, of the fishing reel being removed.

When turning the adjusting knob 24, its second toothing 34 makes, by way of the toothing 33, the wheel 31 turn for adjusting the braking effect of the magnetic brake on the line spool 4. When the adjusting knob 24 is in its first position (MIN), the shielding plate 32 is, due to the turning of the wheel 31, in a first position (FIG. 4), in which it is placed straight in front of the magnets 27 and completely shields the magnets in order to cancel their inductive cooperation with the end wall 4a of the line spool 4. When the adjusting knob 34 is turned to its second position (MAX), the wheel 31 and thus the shielding plate 32 are turned to a second position (FIG. 5), in which the shielding plate is moved aside and completely uncovers the magnets 27.

A desired braking effect on the line spool 4 thus is adjustable by the adjusting knob 24 being turned to a suitable position and both the mechanical brake and the magnetic brake will thus be set in the intended braking position —the mechanical brake by the sleeve 10 being pressed against the friction washer 16 by a force dependent on the turning position of the adjusting knob 24 and the magnetic brake by the shielding magnet 32 shielding the magnets 27 to a degree which is dependent on the turning position of the adjusting knob 24. It should also be noted that the braking effect of the two brakes on the line spool 4 is completely canceled when the adjusting knob 24 is in its first position (MIN). It should further be noted that the adjusting knob 24 with the toothings 25, 34, the sleeve 22 with the toothing 26, the hub portion 7a with its toothing and the wheel 31 with the toothing 33 are arranged in such a manner that turning of the adjusting knob 24 in one direction makes both the sleeve 22 and the wheel 31 turn for increasing the braking effect of the respective brakes on the line spool 4, and turning of the adjusting knob 24 in the other direction makes both the sleeve 22 and the wheel 31 turn for reducing the braking effect of the respective brakes on the line spool.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What I claim and desire to secure by Letters Patent is:

1. A reel, comprising:
   side plates mounted on a frame of the fishing reel;
   a line spool, mounted in the frame and rotatable about an axis of rotation;
   a first and a second brake for braking the line spool, a braking effect of the first brake on the line spool being dependent on a speed of rotation thereof and a braking effect of the second brake on the line spool being independent of the speed of rotation thereof;
   a first adjusting device, adapted to aid in adjusting the braking effect of the first brake and being turnable about an axis parallel to the axis of rotation; and
   a second adjusting device, adapted to aid in adjusting the braking effect of the second brake and being turnable about an axis parallel to the axis of rotation, wherein
   the first and the second adjusting devices are arranged in one of said side plates and respectively a first and a second tooth portion provided with toothing; and
   an operating device, turnable about an axis parallel to the axis of rotation, mounted on said one side plate, and operable from an outside thereof, the operating device including at least one tooth element meshing with the first and the second tooth portion to turn, in turning of the operating device, respectively the first and the second adjusting devices to adjust the braking effect of the respective brakes on the line spool.

2. A fishing reel as claimed in claim 1, wherein the operating device includes a first tooth element meshing with the first tooth portion and a second tooth element meshing with the second tooth portion.

3. A fishing reel as claimed in claim 2, wherein the axes of the first and the second adjusting devices coincide with the axis of rotation, the first and the second adjusting devices being axially spaced from each other.

4. A fishing reel as claimed in claim 3, wherein the operating device and the adjusting devices are arranged such that turning of the operating device in one direction makes both the first and the second adjusting devices turn to increase the braking effect of the respective brakes on the line spool, and wherein turning of the operating device in the other direction makes both the first and the second adjusting devices turn to reduce the braking effect of the respective brakes on the line spool.

5. A fishing reel as claimed in claim 2, wherein the operating device and the adjusting devices are arranged such that turning of the operating device in one direction makes both the first and the second adjusting devices turn to increase the braking effect of the respective brakes on the line spool, and wherein turning of the operating device in the other direction makes both the first and the second adjusting devices turn to reduce the braking effect of the respective brakes on the line spool.

6. A fishing reel as claimed in claim 2, wherein the first brake is a magnetic brake and the second brake is a mechanical friction brake.

7. A fishing reel as claimed in claim 1, wherein the axes of the first and the second adjusting devices coincide with the axis of rotation, the first and the second adjusting devices being axially spaced from each other.

8. A fishing reel as claimed in claim 7, wherein the operating device and the adjusting devices are arranged such that turning of the operating device in one direction makes both the first and the second adjusting devices turn to increase the braking effect of the respective brakes on the line spool, and wherein turning of the operating device in the other direction makes both the first and the second adjusting devices turn to reduce the braking effect of the respective brakes on the line spool.

9. A fishing reel as claimed in claim 7, wherein the first brake is a magnetic brake and the second brake is a mechanical friction brake.

10. A fishing reel as claimed in claim 1, wherein the operating device and the adjusting devices are arranged such that turning of the operating device in one direction makes both the first and the second adjusting devices turn to increase the braking effect of the respective brakes on the line spool, and wherein turning of the operating device in the other direction makes both the first and the second adjusting devices turn to reduce the braking effect of the respective brakes on the line spool.

11. A fishing reel as claimed in claim 10, wherein the first brake is a magnetic brake and the second brake is a mechanical friction brake.

12. A fishing reel as claimed in claim 1, wherein the first brake is a magnetic brake and the second brake is a mechanical friction brake.

13. A fishing reel as claimed in claim 1, wherein the fishing reel is a multiplier type fishing reel.

14. A fishing reel, comprising:
   means for braking a spool of the fishing reel, wherein a first braking effect on the spool is dependent on a speed of rotation of the spool and a second braking effect on the spool is independent of the speed of rotation of the spool;
   first adjusting means for adjusting the first braking effect of the means for braking and being turnable about an axis parallel to the axis of rotation; and
   second adjusting means for adjusting the second braking effect of the means for braking and being turnable about an axis parallel to the axis of rotation, wherein the first and the second adjusting means include respectively a first and a second tooth portion; and
   operating means, turnable about an axis parallel to the axis of rotation, for operating the first and second adjusting means, the operating means including at least one tooth element meshing with the first and the second tooth portion to turn, in turning of the operating means, respectively the first and the second adjusting means to adjust the respective first and second braking effects on the spool.

15. A fishing reel as claimed in claim 14, wherein the operating means includes a first tooth element meshing with the first tooth portion and a second tooth element meshing with the second tooth portion.

16. A fishing reel as claimed in claim 14, wherein the axes of the first and the second adjusting means coincide with the axis of rotation, the first and the second adjusting means being axially spaced from each other.

17. A fishing reel as claimed in claim 14, wherein the operating means and the adjusting means are arranged such that turning of the operating means in one direction makes both the first and the second adjusting means turn to increase the respective first and second braking effects on the spool, and wherein turning of the operating means in the other direction makes both the first and the second adjusting means turn to reduce the respective first and second braking effects of the respective brakes on the line spool.

18. A fishing reel as claimed in claim 14, wherein the braking means includes a magnetic brake to produce the first braking effect and a mechanical friction brake to produce the second braking effect.

19. A fishing reel as claimed in claim 14, wherein the fishing reel is a multiplier type fishing reel.

* * * * *